United States Patent [19]

Hudson

[11] Patent Number: 4,993,177
[45] Date of Patent: Feb. 19, 1991

[54] AIR FRESHNER SUPPORT

[76] Inventor: Teresa L. Hudson, 34631 Bayview, Westland, Mich. 48185

[21] Appl. No.: 418,518

[22] Filed: Oct. 10, 1989

[51] Int. Cl.⁵ .............................................. G09F 1/12
[52] U.S. Cl. .................................... 40/152.1; 40/156; 40/593
[58] Field of Search ................. 40/124.1, 152, 152.1, 40/647, 591, 156, 593, 352, 124; 362/206; 239/51.5, 54, 57, 58

[56] References Cited

U.S. PATENT DOCUMENTS

| | | | |
|---|---|---|---|
| 1,462,419 | 7/1923 | Mandel | 40/156 |
| 2,181,409 | 11/1939 | Patterson | 40/611 |
| 2,762,037 | 9/1956 | Hetzler | 362/206 X |
| 2,833,072 | 5/1958 | Gregory | 40/152.1 |
| 2,887,804 | 5/1959 | Wise | 40/152.1 |
| 3,039,219 | 6/1962 | Stefanakis | 40/152 |
| 3,255,544 | 6/1966 | Bornholt | 40/156 |
| 3,327,419 | 6/1967 | Stanos | 40/124 |

Primary Examiner—Kenneth J. Dorner
Assistant Examiner—J. Bonifanti
Attorney, Agent, or Firm—Charles W. Chandler

[57] ABSTRACT

A frame to hold a photograph between a front wall and a back cover has an air freshener holder on the back of the back cover. The frame is arranged to be attached to a support that holds the air freshener exposed to the atmosphere.

6 Claims, 1 Drawing Sheet 4,993,177

AIR FRESHNER SUPPORT

BACKGROUND OF THE INVENTION

This invention relates to a support for an air freshener, in particular to a support that holds both a photograph and an air freshener for use in automobiles.

It has been proposed heretofore in U.S. Pat. No. 2,833,072 of Gregory; and in U.S. Pat. No. 2,887,804 of Wise to provide means for supporting a photograph on the dashboard of an automobile. In each instance the photograph is well protected by a relatively airtight enclosure that would be unsuitable for holding an air freshener pad or panel that must be exposed to the air in order to freshen it.

It is one object of the present invention to provide means in the form of a photographic frame to support an air freshener in such a way as to allow the air freshener to be easily inserted and removed and to be held in a position that permits easy access to the freshening material by smoke and other odors in the air within an automobile.

Another object is to provide a support frame with means that permit it to be affixed to a rigid part of the interior of the automobile, either by being adherently joined to the rigid part or suspended from the rigid part.

A further object is to provide an air freshener holder that allows the freshener element to be easily removed and replaced.

Still further objects will become apparent from the following description in conjunction with the accompanying drawings.

In accordance with this invention a photographic frame that holds a photograph has a retainer, or rear cover, with a bracket or a pocket adjacent one edge and open toward the opposite edge to engage a small part of the edge of an air freshener pad or member. In order to hold the air freshener stable with only a small part of its edge engaging the bracket or the pocket, the holder includes a bridge that extends outwardly from the back surface of the cover and spans a distance great enough to allow the air freshener member to be slid under it and into engagement with the bracket or pocket. The bridge is narrow and covers only a small part of the total surface of the air freshening material so as not to interfere with the air freshening operation.

One form of attachment mean consists of slotted brackets located on the back cover to receive a chain that can be looped over any convenient supporting means, such as the arm by which the rear view mirror of the car is attached to the inner surface of the windshield. Alternatively, the frame supporting the air freshener may be attached to a support by hook-and-loop material. A piece of one type of such material, for example the hook material may be adherently affixed to the rearwardly facing of the bridge and a piece of the converse type of the hook-and-loop material, such as that having the loops, may be adherently attached to a fixed surface in the automobile such as the surface of the dashboard. The two pieces of hook-and-loop material can then be joined together to hold the frame firmly but releasably and with the air freshener pad facing the surface on which it is mounted but spaced a short distance from that surface to allow air to pass easily between the air freshener panel and the surface of the automobile.

BRIEF DESCRIPTION OF THE DRAWINGS

The description refers to the accompanying drawings in which like reference characters refer to like parts throughout the several views and in which.

DETAILED DESCRIPTION OF THE INVENTION

Figure 1:
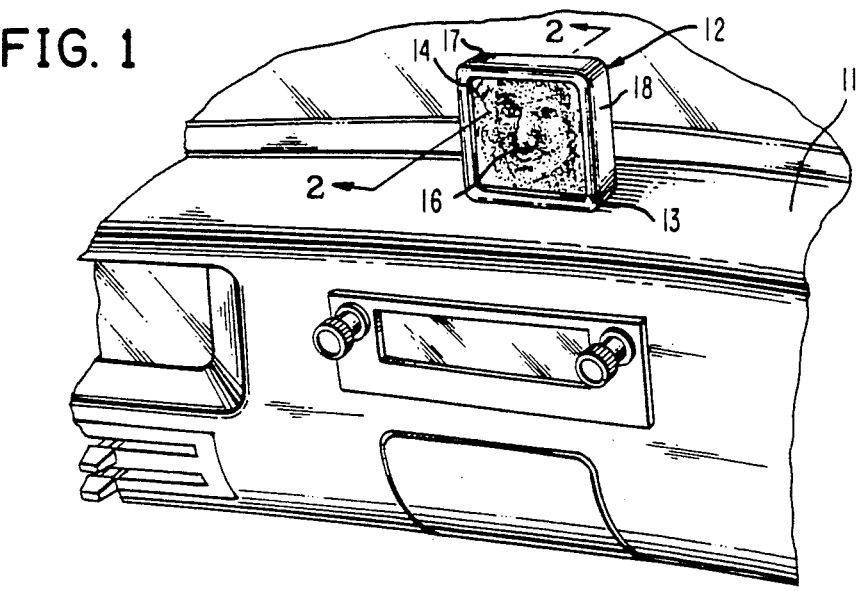
FIG. 1 shows a fragment of a dashboard of an automobile with a photographic frame capable of holding an air freshener member rigidly affixed to the dashboard.

FIG. 1 shows the dashboard 11 of an automobile with a photographic frame 12 mounted on it. There are several ways to attach the frame to the dashboard, one of which is to use adhesive to join the lower side of the frame to the upper side of the dashboard. In this instance the frame consists of a rectangular flat front panel, or wall 13, with an opening 14 to view a photograph or other picture 16. Four sides extend back a short distance from the edges of the panel 13 but only two of these sides, indicated by numerals 17 and 18, are visible in FIG. 1.

Figure 2:
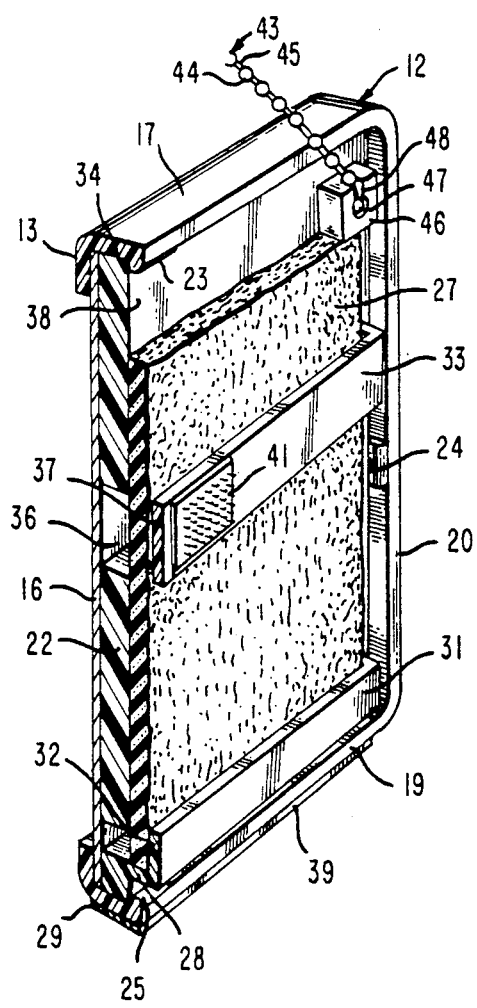
FIG. 2 is a cross-sectional, perspective view of a fragment of a frame in accordance with this invention.

FIG. 2 shows only half of the frame 12 and the parts associated with it. These include half of the top and bottom sides 17 and 19 and the remaining vertical side 20. The four sides and the front panel 13 combine to form, in effect, a shallow receptacle within which the photograph 16 is nested against the back surface of the front panel and is held in place by retention means in the form of a back cover 22. Preferably both the frame 12 and the back cover 22 are molded of a suitable thermosetting plastic material. The back cover 22 is held in place by holding means comprising several small projections, of which projections 23-25 are shown, and which extend inwardly from the back edges of the sides 17, 20 and 19, respectively.

In addition to holding a photograph 16, a second function of the frame 12 is to hold an air freshener member, which is typically a rectangular pad or panel 27. In order to hold the air freshener member, the back cover 22 is provided with a bracket, or shelf 28 that projects rearwardly from the rear surface of the back cover. In this embodiment, the shelf extends longitudinally along the bottom part of the back cover 22 near its lower edge 29, and as a further means of securing the air freshener panel 27 in position, a barrier in the form of a low wall 31 or edge holder extends upwardly from the outer edge of the shelf 28. The barrier and the shelf combine to form a receptacle, or pocket 32, which is open toward the opposite edge 34 of the cover 22 and into which it is possible to slide an edge portion of the air freshener panel.

It is important that the air freshening material contained in the panel 27 be exposed to the air in order to pick up the odors and to emit a more pleasant aroma. As a result, the barrier 31 should not cover up more than one-third of the total area of the air freshener panel 27 and in the embodiment shown in FIG. 2 the barrier extends over a much smaller part of the air freshener panel. While the pocket 32 may be able, by itself, to retain the air freshener panel 27, if the pocket is deep enough, a second barrier portion in the form of a bridge 33 will hold the panel more securely. The bridge extends across the air freshener panel at a location between the shelf 28 and the opposite edge 34 of the back cover 22. The bridge spans a distance at least substantially equal to the width of the panel 27 and is preferably integrally molded with the back cover. For this reason, a central part of the back cover is missing, thereby leaving an open space 36 to be occupied by a molding tool to form the undersurface 37 of the bridge 33 during the molding operation.

The distance between the back surface 38 of the back cover 22 and the under surface 37 of the bridge is preferably at least substantially as great as the thickness of the air freshener panel 27 to allow the air freshener panel to be easily inserted behind the bridge 33 and into the pocket 32.

Figure 3:
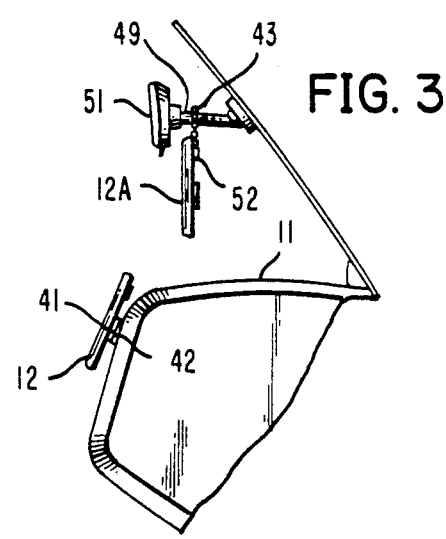
FIG. 3 is a side view illustrating a small part of the dashboard of an automobile with one of the frames in FIG. 2 mounted on it and another suspended above it.

The frame 22 can be attached to a support in any of several ways. As indicated in FIG. 1, the frame can be attached to the dash board 11 by adhesive means, such as strip 39 of double-surface, pressure-sensitive adhesive. The frame can also be attached to a support by affixing a piece of hook-and-loop material 41 to the rearwardly facing surface of the bridge 33. Such material, sold under the trademark "Velcro" is formed by weaving small plastic hooks in one type of the material. A second, or converse, type of material has loops that can be grasped by the hooks. Such an arrangement is shown in FIG. 3 in which a layer 41 of one type of hook-and-loop material is adherently joined to the rearward-facing surface of the bridge 33, which is level with the rearward part of the frame 12. The layer 41 is interlocked with a layer 42 of the converse type of hook-and-loop material firmly attached to the dash board 11.

Another way of attaching the frame 12 to a support is by means of a chain 43 shown in FIG. 2. This type of chain consists of a series of small beads 44 joined together by cylindrical links 45. One end of the chain 43 is inserted in a projection 46 that extends from one upper corner of the back surface 38 of the back cover 22 and is provided with a recess 47 just large enough to hold one of the beads 44 and a slot 48 at the top just large enough to permit one of the links 45 to fit in it. The projection 46 and another projection similar to it are placed far enough apart and high enough on the back surface 38 to allow the air freshener panel 27 to be easily inserted past them and into the position shown in FIG. 2.

FIG. 3 shows a frame 12A identical with the frame 12 suspended from an arm 49 that holds the rear view mirror 51 of the automobile. In FIG. 3, the projection 46 is directly behind the projection 52 that is symmetrically located with respect to it on the back cover nested within the frame 12A.

While this invention has been described in specific terms, it will be understood by those skilled in the art that modifications may be made in it without parting from the true scope of the invention as defined by the following claims.

I claim:

1. A photographic display device for supporting a flat air freshener panel, said display device comprising:

a front wall having an opening therein through which to view a photograph;

retention means to retain the photograph in place to be viewed through the opening, the retention means comprising a back surface facing away from the front wall, the retention means being molded of plastic as a substantially rectangular plate having first and second edges parallel to each other, and third and fourth edges parallel to each other;

holding means to hold the retention means to the front wall;

receiving means behind the back surface of the retention means to receive an air freshener panel, the receiving means comprising a barrier spaced rearwardly relative to the retention means to hold the air freshener panel with more than half of one surface thereof exposed to the air;

attachment means to attache the photographic display device to a separate support, the attachment means comprising slotted projection means extending rearwardly of the back surface of the retention means to receive and grip a chain by which to suspend the display device from the separate support; and the slotted projection means and the receiving means being integrally molded with the plate as a unitary structure, the receiving means comprising a shelf molded adjacent the first edge of the rectangular plate, and the projection means comprise two projections molded adjacent the two corners of the plate at the ends of the second edge, the projections and the shelf defining, between them, a space large enough to receive the air freshener panel, and the barrier comprising an elongated wall having ends joined integrally with central parts of the third and fourth edges and extending over an open area of the plate between those central parts.

2. The display device of claim 1, in which the retention device is molded of plastic material and the receiving means is formed on, and extends across a part of the back surface of the retention device to cover less than half of the rearwardly facing surface of an air freshener panel.

3. The display device of claim 2, in which the receiving means comprises a shallow pocket near one edge of the retention means and open toward the opposite edge thereof to receive only an edge portion of the air freshener panel.

4. The display device of claim 1, in which the receiving means comprises shelf means near one edge of the retention means to engage an edge portion of the air freshener panel and to cooperate with the barrier in holding the air freshener panel close to the retention means.

5. The display device of claim 4, in which the barrier is located between the shelf means and the opposite edge of the retention means, and has a width not substantially greater than one-third the distance between the shelf means and the opposite edge.

6. The display device of claim 1, in which the retention means, the barrier and the shelf means are molded of plastic as an integral member.

* * * * *